United States Patent [19]

Goldsmith

[11] 4,238,888
[45] Dec. 16, 1980

[54] DIRECT READING MICROMETER FOR SINE-BAR ELEVATION

[76] Inventor: Wesley R. Goldsmith, 3387 Moore Street, Mar Vista, Calif. 90066

[21] Appl. No.: 740,813

[22] Filed: Nov. 11, 1976

[51] Int. Cl.³ .............................. G01B 3/18; G01B 3/30
[52] U.S. Cl. ...................................... 33/174 S; 33/166
[58] Field of Search ............................... 33/174 S, 166

[56] References Cited

U.S. PATENT DOCUMENTS

| | | | |
|---|---|---|---|
| 2,505,928 | 5/1950 | Worby | 33/174 S |
| 2,791,034 | 5/1957 | Handy | 33/166 |
| 3,195,238 | 7/1965 | Grenell | 33/174 S |

*Primary Examiner*—Willis Little

*Attorney, Agent, or Firm*—William H. Maxwell

[57] ABSTRACT

The combination of a sine-bar and micrometer for directly reading angular displacement of the sine-bar, the micrometer being comprised of a barrel having a curvilinear index line with axial calibration in degrees and displaced from rotation of an extension screw of uniform pitch, and a thimble with circumferential calibrations in minutes and rotating with the said extension screw to be revolved in reference to said curvilinear index line and thereby extended in decreasing amounts corresponding to the height dimensions required in order to establish sine-bar angularity, and with curvilinear vernier calibrations parallel to said curvilinear index line for readings in seconds as well as degrees and minutes.

22 Claims, 7 Drawing Figures

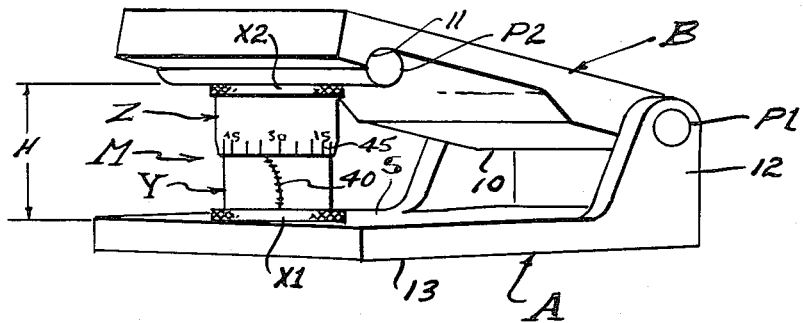
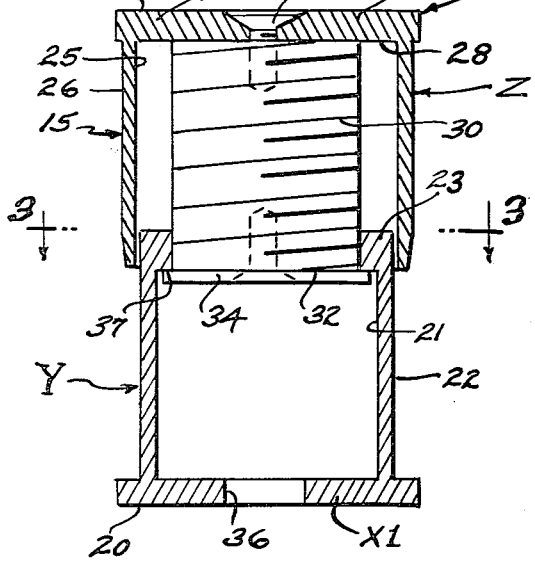
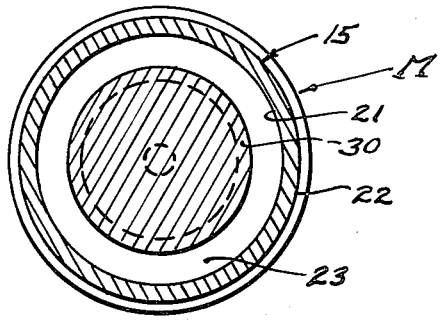
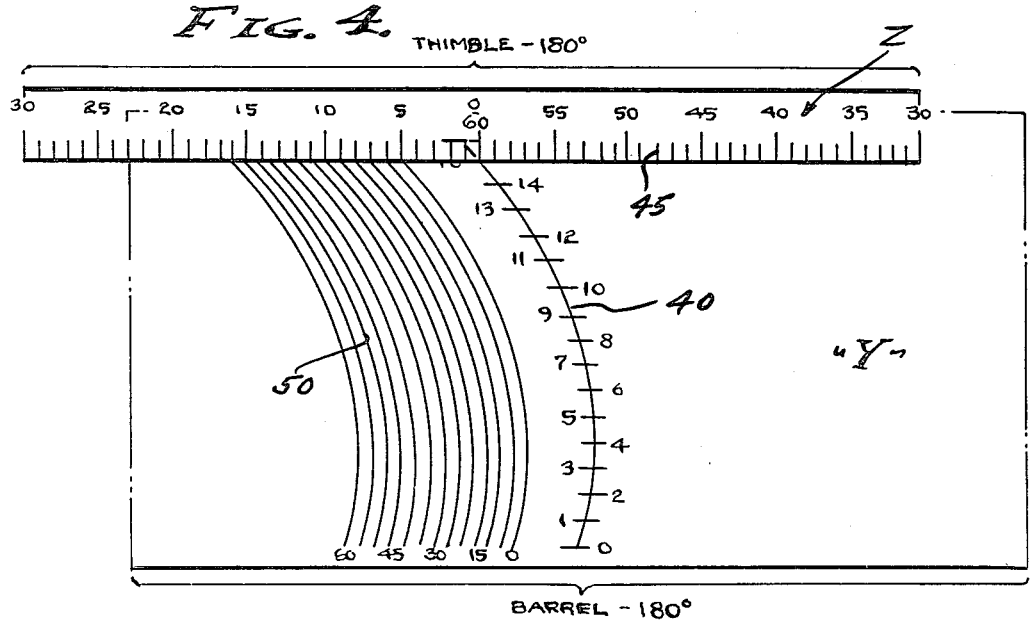

DIRECT READING MICROMETER FOR SINE-BAR ELEVATION

BACKGROUND

The sine-bar is used for angular measurements or for locating work at a given angle as, for example, in measuring or checking angles with accuracy using precision gage-blocks selected for whatever dimension is required in obtaining a given angle. Precision gage blocks are usually purchased in sets comprising a specific number of blocks of different sizes determined mathematically so that particular desired lengths can be obtained by combining select blocks, two or more blocks being combined by "wringing" them together with a swiveling motion causing them to adhere firmly one to another. When combining blocks for a given dimension, the object is to use as few blocks as possible, the procedure being based upon successive elimination of the right hand digit of the desired dimension. For example, the combined blocks measuring 0.1002 + 0.124 + 0.450 + 3.00 equals 3.6742 inches. An accurate surface plate or master flat is always used in conjunction with a sine-bar in order to form the base from which the vertical measurements are made, heretofore with precision gage blocks. A standard length for sine-bars is five inches (also ten inches) and there are tabulated constants that represent vertical heights H for setting a five inch sine-bar to the required angle. Assuming that the required angle is 31° 20', the sine tables show that the height H should equal 2.6001 inches. Note that the constants in the sine tables equal five times the sine of angle; thus the sine of 31° 20' in the trigonometric function table is 0.52002, and 0.52002×5 equals 2.6001 inches. There are many such functions for the use of a sine-bar, such as finding and checking angles, measuring angles and tapers and to determine center distances etc. However, note the complexity and precision of the involved process of using combinations of gage blocks according to the tabulated constants of the sine tables, in order to arrive at a precise angle; it being a general object of this invention to facilitate sine-bar operation with direct readings on the barrel of a micrometer that establishes the height H with precision and corresponding to the angular displacement of the sine-bar.

Sine-bars are precision devices for measuring angles accurately and locate work at a desired angle to some true surface, preferably a surface plate or the like. Sine-bars consist of a hardened, ground and laped steel bar which has accurately spaced cylindrical plugs of equal diameter attached to or near each end. The sine-bar has notched ends for receiving the cylindrical plugs which are held firmly against angular faces of the notch, for example exactly five inches or ten inches apart. The upper and lower sides of the sine-bars are parallel to the axes of the plugs within very close limits. The exact degree of angularity which a five inch or ten inch bar makes with a plane surface is obtained by determining the precise difference in vertical height of the spaced plugs. There are various forms of sine-bars and a refinement and/or carrying forward of the sine-bar concept involves simple and compound sine plates characterized by a precision plate pivoted by a plug at one end to a base and adapted to be elevated by the plug at the other end. In compound sine plates, the work supporting sine plate employs the underlying sine plate as its base. In any event, gage blocks have been used for elevating the sine plates respectively, and it is an object of the present invention to utilize the direct reading micrometer for elevation of the plug to be precisely positioned as to height H from the base plane or flat, all as hereinafter disclosed.

Micrometers take various forms, comprised generally of two visible elements and namely a barrel and a thimble, the barrel operating on a screw having forty threads per inch so that one revolution moves the barrel and thimble one fortieth of an inch. A feature is the relationship of calibrations on one element relative to an index line on the other element. In normal practice, the barrel is provided with a straight axially disposed index line stepped off incrementally in calibrations spaced 0.025 inch, and the thimble with an edge overlying said index line and calibrated circumferentially into twenty-five equal parts. Thus, each line on the thimble represents one thousandths of an inch, while each calibration line on the barrel represents twenty-five thousandths of an inch. It is an object of this invention to provide an inside micrometer that reads in degrees of angle as related to a sine-bar of given length, and wherein minutes of angle as well as seconds of angle are available as scaled readings. With the present invention, a vernier scale is provided in addition to the regular scales so that settings in degrees, minutes and seconds are available.

DRAWINGS

The various objects and features of this invention will be fully understood from the following detailed description of the typical preferred forms and applications thereof, throughout which description reference is made to the accompanying drawings, in which:

FIG. 1 is a perspective view of the direct reading micrometer applied to a sine-bar in accordance with the present invention.

FIG. 2 is a cross sectional elevation of the micrometer positioned as it is shown in FIG. 1.

FIG. 3 is a transverse sectional view of the micrometer taken as indicated by line 3—3 on FIG. 2.

FIG. 4 is a diagrammatic layout of the barrel and spindle calibrations for a first range of direct reading the micrometer in degrees, minutes and seconds of sine-bar angularity.

Figure 5:
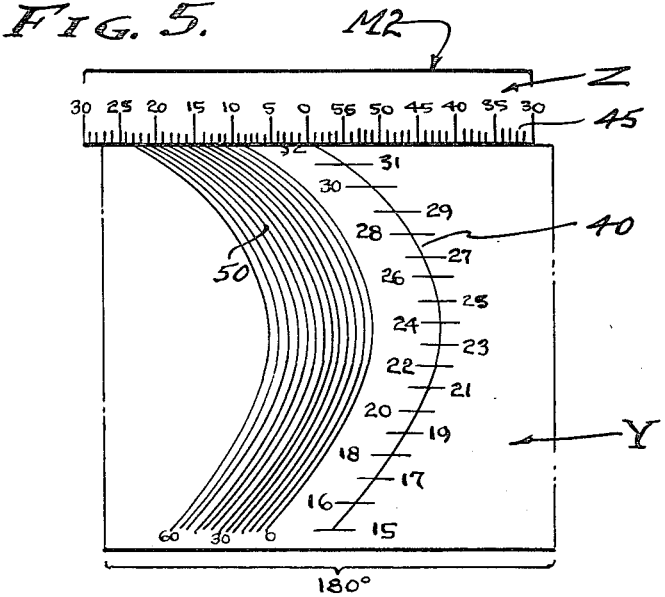
Figure 6:
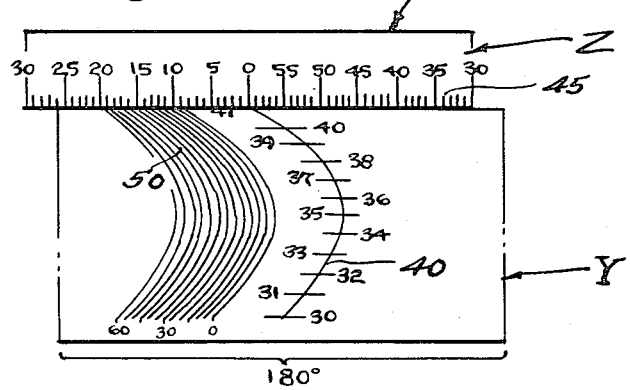
Figure 7:
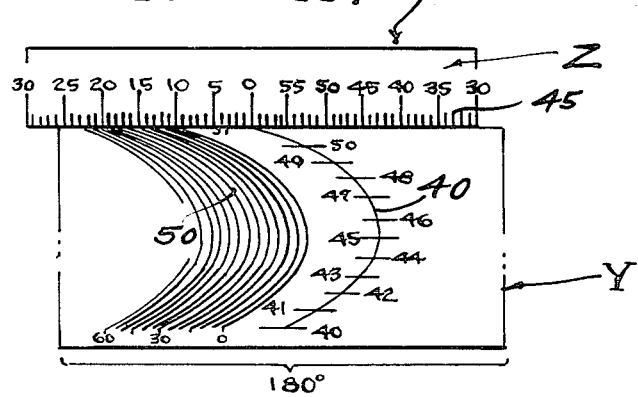

And, FIGS. 5, 6 and 7 are diagrammatic layouts similar to FIG. 4 and showing second, third and fourth ranges up to 51°.

PREFERRED EMBODIMENT

Micrometers are direct reading gages for measuring distance, and it is an inside measurement of height H between a horizontal flat surface S and a sine-bar plug P2 with which this invention is concerned. As shown, there is a sine-bar B, five inches in length, notched at 10 and 11 where spaced transverse and parallel plugs P1 and P2 are attached. The surface S is provided on the flat base A having a bearing 12 elevated at one end to carry plug P1 on its transverse axis parallel to surface S, and in turn parallel to the supporting underside 13 of the base A. In practice, the axis of bearing 12 elevates the lowermost periphery of plug P1 two to three inches from the planar surface S, thereby providing a clearance plane from which the micrometer M operates, as next to be described. The sine-bar or sine plate, simple or compound, is to be made according to accepted practice and standards with the vertical height offset H as specified above.

The micrometer M is shown in its basic form comprised of a pair of telescopically arranged elements, and including spaced anvils X1 and X2, a barrel Y and a thimble Z. The thimble has a skirt 15 rotatable over the barrel, the former carrying anvil X2 and the latter carrying anvil X1, all of which are coaxially related so as to be employed in a vertical alignment with the anvils X1 and X2 in spaced horizontally parallel relation. Accordingly, the micrometer M is essentially an extensible right cylinder characterized by telescopically related barrel and thimble elements positioned by an extension screw 30.

The barrel Y is in the nature of a column with the anvil X1 forming its base. The base has a bottom face 20 normal to its vertical axis, with inner and outer cylinder walls 21 and 22 extending upward from the base. The outside diameter carries the index line and vernier lines later described, and is a nominal 1.910 inch diameter for the first range micrometer M and a nominal 0.955 inch diameter for the second, third and fourth range micrometers M2, M3 and M4 as later described. The upper head portion 23 of the barrel Y is open to threadedly receive the extension screw 30, the head being threaded to a depth of 0.25 inch. As shown, the periphery of the barrel at the anvil is knurled for manual engagement.

The thimble Z is in the nature of a cup inverted over the barrel and with the anvil X2 forming its cover 24, and with inner and outer cylinder walls 25 and 26 extending downward over the barrel wall 22 with working clearance. The walls 25 and 26 form the skirt 15 that is beveled at its lower peripheral edge to receive minute calibrations, at intervals as later described. The top side 27 of the cover is normal to the vertical axis and the bottom side 28 thereof is parallel to the former. As shown, the periphery of the thimble at the anvil thereof is knurled for manual engagement.

The extension screw 30 is a right cylinder adapted to threadedly engage through the head portion 23 of the barrel Y and to carry the thimble Z. To this end, the exterior of the screw 30 is provided with a number of threads per inch that approximates a degree of angular rise for a determined amount of rotation thereof related to the length of the sine-bar involved. The increment of rotation can be one full turn or a part turn thereof, for example a half turn for each degree of rise as shown. The length of the sine-bar can be five inches as is indicated, and in which case 5¾ threads per inch can be used, for the first range micrometer M, for example, the first 0° to 16° of rise (from horizontal, see FIG. 4) of the sine-bar B. In carrying out this invention, the 5¾ thread pitch provides substantially one degree of sine-bar displacement from 0° to 1° when rotating the thimble 180°, and increasingly excessive increments extension as degrees of sine-bar displacement are added. And in practice, 6¼ threads per inch can be used for the second range micrometer M2, for example the second 15° to 32° of rise (see FIG. 5), 7 threads per inch can be used for the third range micrometer M3, for example the third 30° to 41° of rise (see FIG. 6), and 8⅛ threads per inch can be used for the fourth range micrometer M4, for example the fourth 40° to 51° rise (see FIG. 7). Thus, it is contemplated that four micrometers can be employed, with or without overlap, for the practical range of sine-bar operation.

The opposite ends 31 and 32, of the screw 30, are flat and normal to its axis, with central openings therein tapped to receive screw fasteners. The top end 31 is secured to the bottom side 28 of the anvil X2 as by means of a screw fastener 33, so as to be rotatably affixed as adjustably required, and anvil X2 frictionally held positioned thereby. A keeper 34 in the form of a disc-shaped stop plate is secured to the bottom end 32 as by means of a screw fastener 35 applied through an access opening 36 in the anvil X1, and presents a shoulder to stop against a complimentary shoulder 37 presented by the head portion 23 of the barrel Y.

Referring now to the barrel Y and the calibration of the index line 40, the thread lead of screw 30 approximates the ever decreasing increments corresponding to each successive degree of rise in relation to angular displacement of the sine-bar B. With the first range micrometer M, one-half turn of the thread helix of 5¾ threads per inch will extend the anvils X1 and X2 0.08965 inch, the height H required for a full degree between 0° and 1° being 0.08725, in which case 0.0003 inch of circumferential travel is added to thimble rotation so as to provide exactly one degree of sine-bar displacement. However, the thread pitch constant of 0.08695 is a function of the continued arc through which the supporting plug P2 passes; and for example, a degree of sine-bar displacement between 14° and 15° requires 0.0845 inch extension of the anvils X1 and X2, in which case 0.0101 inch of circumferential travel is subtracted from thimble rotation so as to provide exactly one degree of sine-bar displacement. Thus, it will be understood, that thimble rotation increases and/or decreases from degree to degree of rise, according to the trigonometric functions that establish angular displacement of the sine-bar. With this invention therefore, the index line 40 is displaced circumferentially from one exact revolution of thimble rotation according to the difference between the thread constant and elevation requirements with decreased increments of rise as required for each degree of angular displacement added to the height H for which the micrometer M is extended. Characteristically therefore, the index line 40 is reversely curvilinear as shown in FIGS. 4, 5, 6 and 7, a circumferentially recurved axially disposed line of increasing and/or decreasing lateral curvature commensurate with the difference between thread pitch and the elevation required to extend the anvils to correspond with the degree of displacement of the sine-bar to be positioned thereby.

Referring now to the thimble Z and to the minutes of calibration 45, each half turn of the thimble relative to index line 40 extends the anvils X1 and X2 one degree of sine-bar elevation, in which case 180° of the beveled skirt 15 is divided by axially disposed lines into sixty equal parts representing minutes of sine-bar displacement. Accordingly, the calibrations are marked 0' to 60' and these calibrations are then visibly related to the index line 40 for direct reading.

Referring now to measurement of height H in seconds of sine-bar displacement, a vernier scale 50 of reversely curvilinear or recurved lines runs parallel to the axially curved index line 40. As shown, the vernier scale 50 is offset from the index line 40 in the direction of rotation and consists of twelve equally spaced lines occupying the circumferential distance of eleven equally spaced minute calibrations 45 on the thimble skirt 15. Accordingly, each of the graduations 50 represents five seconds of angular displacement and are visibly related to the calibrations 45 for direct reading by observing marking value of the graduation 50 that most closely coincides with a calibration 45.

From the foregoing it will be seen that the micrometer M is simple and durable in its construction, and adapted to be calibrated with accuracy. Height adjustment is made with facility by revolving the opposite anvils relative to each other, whereupon a direct reading in degrees, minutes and seconds is viewable. The gage extension is corrected with facility, by resetting the rotatable position of the thimble as related to an exact position of the extension screw. And, the full practical range of sine-bar operation can be accomplished in four relatively compact micrometers M, M2, M3 and M4, each having a thread displacement substantially equal to an intermediate degree of height change of the range involved therewith. Characteristically, the 0° calibration of micrometer M is located at an offset height from the surface S to provide 0° angularity of the sine-bar B and from which the anvils X1 of the micrometers M2, M3 and M4 are extended. The 15° calibration on index line 40 of micrometer M2 is elevated to the height of 1.2941 by its extended anvil X1 (see FIG. 5), the 30° calibration on index line 40 of micrometer M3 is elevated to the height of 2.500 by its extended anvil X1 (see FIG. 6), and the 40° calibration on index line 40 of micrometer M4 is elevated to the height of 2.2139 by its extended anvil X1 (see FIG. 7). Thus, it is a simple and expedient matter to employ the micrometer which includes the angle to which the sine-bar is to be set.

Having described only typical preferred forms and applications of my invention, I do not wish to be limited or restricted to the specific details herein set forth, but wish to reserve to myself any modifications or variations that may appear to those skilled in the art.

I claim:

1. The combination of a sine-bar and micrometer for directly reading angular displacements of the sine-bar:
   the sine-bar including, a bar supportably engaged by spaced and parallel plugs with one plug carried by and on an axis above a base presenting a surface plane and with the other plug on an axis movably spaced above said plane for height positioning;
   the micrometer including, a pair of extensible anvils carried by a barrel and thimble respectively and disposed on a common axis with oppositely disposed anvil faces normal to said common axis and engageable with the said surface plane and second mentioned plug respectively, an extension screw of uniform thread pitch interconnecting the barrel and thimble on said common axis, a circumferentially recurved index line extending axially on the barrel and with axially spaced calibrations in degrees of sine-bar angularity as related to said thread pitch and recurvedly displaced with respect to rotation of the extension screw, and circumferential calibrations in minutes of sine-bar angularity on a skirt of the thimble and rotatable over the barrel to be positioned in reference to said recurved index line as related to said thread pitch to establish elevation of the second mentioned plug for sine-bar angularity.

2. The sine-bar and micrometer combination as set forth in claim 1, wherein a set of recurved vernier lines is disposed to extend axially on the barrel in parallel relation to the recurved index line.

3. The sine-bar and micrometer combination as set forth in claim 1, wherein a set of recurved vernier lines numbering one in excess of matching minute calibrations on the thimble skirt extend axially on the barrel in parallel relation to the said recurved index line.

4. The sine-bar and micrometer combination as set forth in claim 1, wherein the thread pitch of the extension screw substantially equals one degree of sine-bar angularity.

5. The sine-bar and micrometer combination as set forth in claim 1, wherein the thread pitch of the extension screw substantially equals the lowermost one degree in a range of degrees of sine-bar angularity.

6. The sine-bar and micrometer combination as set forth in claim 1, wherein a rotational portion of the thread pitch of the extension screw substantially equals one degree of sine-bar angularity.

7. The sine-bar and micrometer combination as set forth in claim 1, wherein a rotational portion of the thread pitch of the extension screw substantially equals the lowermost one degree in a range of degrees of sine-bar angularity.

8. The sine-bar and micrometer combination as set forth in claim 1, wherein the recurved index line is displaced circumferentially on the barrel at each degree calibration a rotational distance establishing each corresponding degree of sine-bar angularity.

9. The sine-bar and micrometer combination as set forth in claim 1, wherein the recurved index line is circumferentially displaced a greater rotational distance at each succeeding higher degree calibration on the barrel establishing each corresponding degree of sine-bar angularity.

10. The sine-bar and micrometer combination as set forth in claim 1, wherein a set of recurved vernier lines is disposed to extend axially on the barrel in parallel relation to the said recurved index line, wherein the thread pitch of the extension screw substantially equals one degree of sine-bar angularity, and wherein the recurved index line is displaced circumferentially on the barrel at each degree calibration a rotational distance establishing each corresponding degree of sine-bar angularity.

11. The sine-bar and micrometer combination as set forth in claim 1, wherein a set of recurved vernier lines numbering one in excess of matching minute calibrations on the thimble skirt extend axially on the barrel in parallel relation to the said recurved index line, wherein the thread pitch of the extension screw substantially equals the lowermost one degree in a range of degrees of sine-bar angularity, and wherein the recurved index line is circumferentially displaced a greater rotational distance at each succeeding higher degree calibration on the barrel establishing each corresponding degree of sine-bar angularity.

12. A direct reading micrometer for elevating a sine-bar plug from a surface plane, and including; a pair of extensible anvils carried by a barrel and thimble respectively and disposed on a common axis with oppositely disposed anvil faces normal to said common axis and engageable with the said surface plane and sine-bar plug respectively, an extension screw of uniform thread pitch interconnecting the barrel and thimble on said common axis, a circumferentially recurved index line extending axially on the barrel and with axially spaced calibrations in degrees of sine-bar angularity as related to said thread pitch and recurvedly displaced with respect to rotation of the extension screw, and circumferential calibrations in minutes of sine-bar angularity on a skirt of the thimble and rotatable over the barrel to be positioned in reference to said recurved index line as related to said thread pitch to establish elevation of the sine-bar plug for sine-bar angularity.

13. The direct reading micrometer as set forth in claim 12, wherein a set of recurved vernier lines is disposed to extend axially on the barrel in parallel relation to the recurved index line.

14. The direct reading micrometer as set forth in claim 12, wherein a set of recurved vernier lines numbering one in excess of matching minute calibrations on the thimble skirt extend axially on the barrel in parallel relation to the said recurved index line.

15. The direct reading micrometer as set forth in claim 12, wherein the thread pitch of the extension screw substantially equals one degree of sine-bar angularity.

16. The direct reading micrometer as set forth in claim 12, wherein the thread pitch of the extension screw substantially equals the lowermost one degree in a range of degrees of sine-bar angularity.

17. The direct reading micrometer as set forth in claim 12, wherein a rotational portion of the thread pitch of the extension screw substantially equals one degree of sine-bar angularity.

18. The direct reading micrometer as set forth in claim 12, wherein a rotational portion of the thread pitch of the extension screw substantially equals the lowermost one degree in a range of degrees of sine-bar angularity.

19. The direct reading micrometer as set forth in claim 12, wherein the recurved index line is displaced circumferentially on the barrel at each degree calibration a rotational distance establishing each corresponding degree of sine-bar angularity.

20. The direct reading micrometer as set forth in claim 13, wherein the recurved index line is circumferentially displaced a greater rotational distance at each succeeding higher degree calibration on the barrel establishing each corresponding degree of sine-bar angularity.

21. The direct reading micrometer as set forth in claim 12, wherein a set of recurved vernier lines is disposed extend axially on the barrel in parallel relation to the said recurved index line, wherein the thread pitch of the extension screw substantially equals one degree of sine-bar angularity, and wherein the recurved index line is displaced circumferentially on the barrel at each degree calibration a rotational distance establishing each corresponding degree of sine-bar angularity.

22. The direct reading micrometer as set forth in claim 12, wherein a set of recurved vernier lines numbering one in excess of matching minute calibrations on the thimble skirt extend axially on the barrel in parallel relation to the said recurved index line, wherein the thread pitch of the extension screw substantially equals the lowermost one degree in a range of degrees of sine-bar angularity, and wherein the recurved index line is circumferentially displaced a greater rotational distance at each succeeding higher degree calibration on the barrel establishing each corresponding degree of sine-bar angularity.

* * * * *